United States Patent [19]

Ben-David

[11] 4,158,961
[45] Jun. 26, 1979

[54] DEVICE FOR TESTING VEHICLES

[76] Inventor: Yona Ben-David, 4, Jasmin St., Ramat-Effal, Ramat-Gan, Israel

[21] Appl. No.: 827,841

[22] Filed: Aug. 25, 1977

[30] Foreign Application Priority Data

Aug. 27, 1976 [IL] Israel .................................. 50371

[51] Int. Cl.² ............................................. G01B 5/255
[52] U.S. Cl. .................................... 73/117; 33/203.13
[58] Field of Search ................. 73/117, 123, 124, 125, 73/126, 127; 33/203.13, 203.12

[56] References Cited

U.S. PATENT DOCUMENTS

| | | | |
|---|---|---|---|
| 3,345,865 | 10/1967 | Ostrander | 73/117 |
| 3,418,849 | 12/1968 | Beer et al. | 73/117 |
| 3,453,740 | 7/1969 | Sakamoto | 33/203.13 |
| 3,527,090 | 9/1970 | Imada | 73/117 |
| 3,651,690 | 3/1972 | Pagdin et al. | 73/117 |
| 3,683,683 | 8/1972 | Demidov et al. | 73/117 |
| 3,871,106 | 3/1975 | Hegenbart | 33/203.13 |
| 3,955,410 | 5/1976 | Wakabayashi et al. | 73/117 |
| 3,962,914 | 6/1976 | Lutz | 73/125 |

Primary Examiner—Anthony V. Ciarlante
Attorney, Agent, or Firm—Browdy and Neimark

[57] ABSTRACT

The invention relates to a testing system for testing motor-car performance under conditions simulating travel in a predetermined range of speeds or engine revolutions comprising in combination:
two parallel rollers arranged close and parallel with each other, one of these being provided with a flywheel of a mass simulating the weight of a motor-car; said rollers being adapted to support the wheel of a motor-car, a third idling roller being provided adjacent the said rollers or between these, means being provided for measuring the lateral force of deflection of this idling roller which is indicative of wheel alignment; said rollers being in contact with said wheel, means being provided for actuating the said flywheel to a predetermined rotational velocity;
means being provided for measuring the rotational speed of the two parallel rollers and of the idling roller and of changes of these; means being provided for automatically indicating or recording numerical data obtained by such measurements or for graphically recording such data or derivatives computed from these, said values being indicative of various values of motor-car performance. According to a preferred embodiment there are provided two parallel systems, each of these adapted for one of the wheels of a pair of wheels of a motor-car, so as to carry out simultaneously two measurements.

15 Claims, 3 Drawing Figures

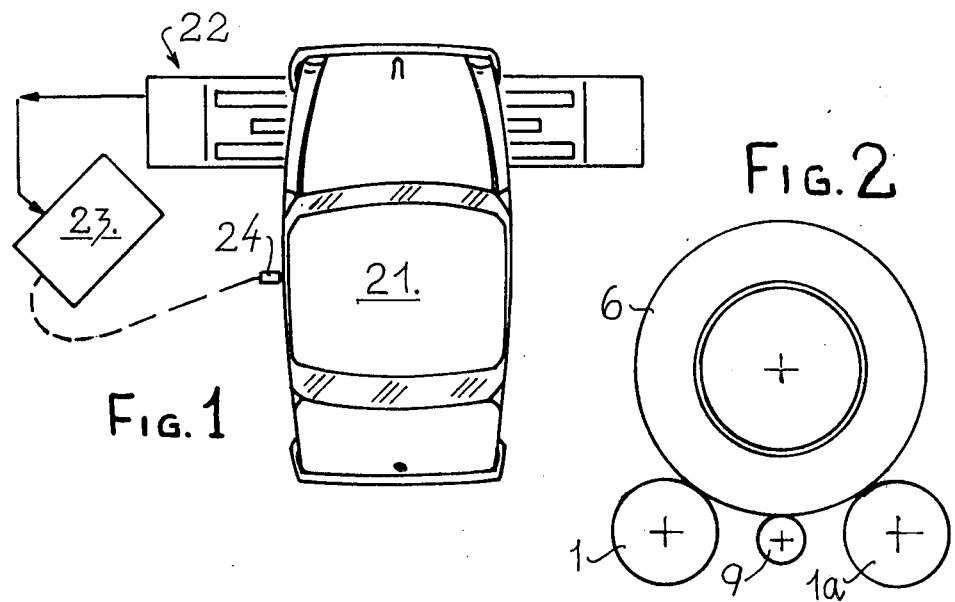
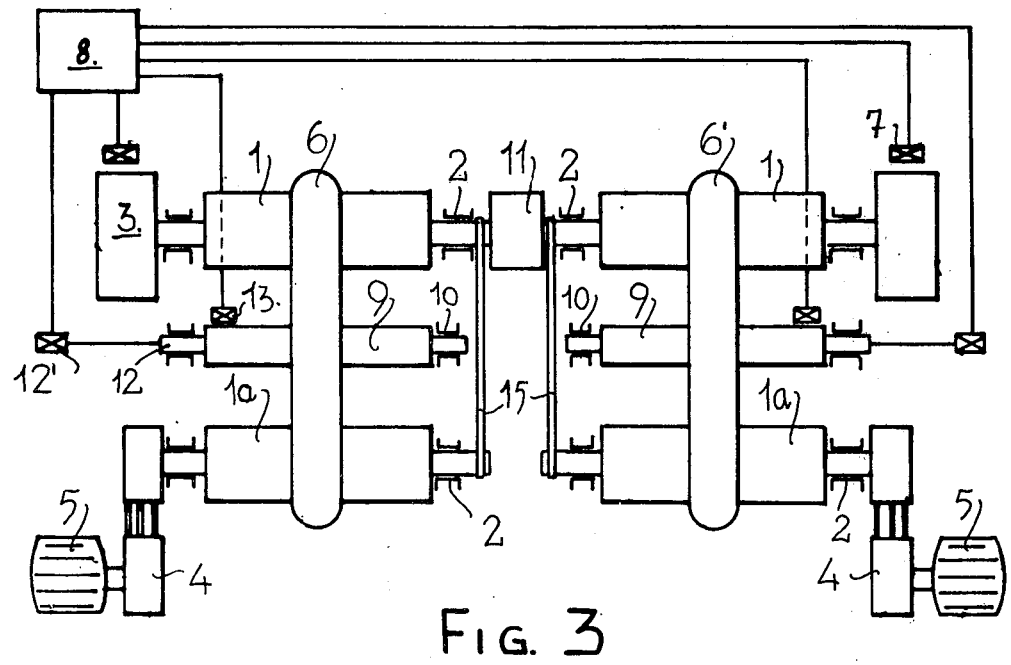

DEVICE FOR TESTING VEHICLES

The present invention relates to a device for measuring quantitatively the important parameters of performance of various systems forming part of motor cars, and especially of the braking system, engine and driving system performance, wheel alignment and the like; to means for recording various parameters at various vehicle speeds and to the record thus obtained. The novel testing device makes possible the quantitative measurement of all the important parameters of motor car performance, such as efficiency of the brake system on each of the wheels, transmission and driving system performance, engine characteristics, wheel alignment on each individual wheel, calibration of the meters of the car, etc. The novel system is adapted to measure the various parameters at a predetermined vehicle speed or at a given number of revolutions of the engine, and it is also adapted to provide a continuous record of such parameters within a predetermined range of velocities or engine revolutions.

The novel system and the records thus obtained are of value in vehicle factories, in car repair and maintenance establishments, in diagnostic and service stations, in establishments carrying out periodical checks of motor cars, etc.

Contrasted with most conventional means for establishing and measuring various parameters of car performance, wherein most of the parameters are measured at a given very low predetermined speed of car travel, according to the present invention it is possible to obtain simultaneously a continuous record of a number of parameters in a range of velocities or engine revolutions and such record is of considerable value in the evaluation of car performance.

Other and further features of the present invention will become apparent hereinafter.

BRIEF DESCRIPTION OF THE INVENTION

The novel testing system according to the present invention comprises two alined parallel rollers at a given distance from each other, a flywheel being mounted on one roller of each pair of such rollers, means for imparting said flywheel a predetermined speed of rotation, and means adapted to measure the deceleration of said flywheel and the rate of deceleration or acceleration of said flywheel, and if desired, to record this rate of deceleration or acceleration. The same system can also be used starting from standstill or from a predetermined initial velocity of rotation, and until a certain higher or lower predetermined rate of rotation is reached.

During the test said rollers are in contact with the forward or rear wheels of the motor car which is being tested and when the car brakes are applied at a given initial velocity of car travel, there is obtained a record of the brake performance simulating actual road conditions. Means are provided for measuring the slip of the vehicle on a road surface, comprising an idling roller located between or adjacent the main rollers, said idling roller being connected with suitable measuring and/or recording means of its velocity of rotation at any given instant.

Means are also provided for measuring the alignment of each of the wheels of a motorcar by measuring the lateral forces due to misalignment of wheels. The alignment of wheels can be measured at any given speed of travel or within a certain range of speeds, and this gives more reliable data than conventional measurements carried out at rest or at one given speed only. Means for measuring the wheel alignment comprise means for measuring the lateral force on the idling roller by the wheel, the alignment of which is being measured.

BRIEF DESCRIPTION OF THE DRAWINGS

The test device and its accessories, the method of measurements carried out therewith and the records thus obtained are described by way of illustration only with reference to the enclosed schematical drawings, which are not according to scale, and in which:

FIG. 1 is a schematical top view of a device according to the invention;

FIG. 2 is a sectional side view illustrating the position of the motor car wheels respective the rollers of the device;

FIG. 3 is a schematical top view of a device adapted to measure wheel alignment.

DESCRIPTION OF THE PREFERRED EMBODIMENT

As illustrated in FIG. 1, the car to be tested (21) is placed with a pair of its wheels (here the front wheels) on the rollers (1), (1a) and (9) of the test device (22) which is equipped with a panel of measuring and recording instruments (23), there being provided a remote control unit (24) enabling the operator to sit in the driver's seat and to control the test device and the recording and measuring devices.

The position of a car wheel on the test device is illustrated in FIG. 2. The wheel (6) of the car is positioned on the two main rollers (1) and (1a), which are parallel and at a given distance from each other, ensuring good contact with the wheel (6) of the car. Between the two rollers (1) and (1a) there is provided a third roller, generally of smaller diameter, which is an idling roller and which is free to move also sideways or to exert a force in the direction of its axis.

The device according to the invention is illustrated with greater detail in FIG. 3, It comprises in combination two rollers (1) and (1a), arranged parallel with each other and at a predetermined distance from each other. These are mounted in bearings (2). There are provided two pairs of such rollers, one for the left hand wheel of the car, and one for the right hand wheel, and these can be operated either while they are connected with each other, or they can be separated so as to record data from each of the wheels (6) and (6') separately. The shaft of rollers (1) is equipped with a flywheel (3) which is actuated via a fluid drive (4) and powered by an electromotor (5). The wheels (6) and (6') of the vehicle to be tested are placed on the two rollers (1) and (1a), and they are also in contact with a third roller (9) which is an idling roller, and which is located between the two rollers (1) and (1a). Actuation of the motor (5) will actuate the rollers (1) and (1a) and also the wheels of the motor car. The flywheel has a substantial momentum. When the rollers (1) and (1a) are brought to a predetermined speed of rotation, say—for example—corresponding to 80 km/hour, the electric motors are shut off and the brake pedal of the car is applied forcefully, preferably by a pedal brake force indicator. The flywheels (3) will continue to rotate due to their momentum of rotation, until the brakes applied to the wheels of the motor car bring them to a standstill.

The number of rotations of the rollers is recorded until the flywheels come to a stop and these are measured by conventional means, such as a digital counter, pointer, recorder, indication by means of light, sound signal or the like (7).

The flywheel (3) can be actuated by a fluid coupling convertor, belt, chain drive or any other suitable driving means.

According to the invention, it is also possible to measure the slip of the vehicle to be tested on a simulated road. In order to carry out this measurement, an idling roller (9) borne in bearing (10) is placed between and parallel to rollers (1) (1a). This roller (9) is connected for measurement to a telemeter of device (8). As can be seen from FIG. 3, roller (9) is in contact with wheel (6) and thus travels at the same speed. When the brakes are applied, the difference between the circumferential travel of rollers (1) or (9) compared to that of wheel (6) indicate the slip.

As shown in FIG. 3 the idling rollers (9) are mounted in ball-type sleeve bearings (10) so that the axis (12) of the idling roller (9) can rotate and also move sideways when a lateral force is applied.

The sensor (13) is mounted against the peripheral surface of roller (9), so that the rotational speed of the shaft can be measured while the sensor (12') is mounted against the butt end of said roller so as to measure its deviation by mechanical and/or electrical means. When a misaligned wheel (6) is mounted between rollers (1) and (1a), while these rotate, a lateral force is applied on roller (9) tending to move it axially, indicating the degree of misalignment.

The lateral force can also be measured by a strain gage piezometer or the like.

Instead of the construction described above, it is possible to resort to one which does not require an axial movement of the roller (9). The roller (9) can be placed on a flexible frame and the lateral force can be measured by means of a load cell or by a similar device.

The surface of the idling roller 9 may be smooth, grooved in any direction, or it may be knurled.

Roller pairs (1) and (1a) may be connected by means of a V belt, (15) chain or the like, so that when a vehicle wheel becomes disengaged from one of the rollers, it will remain in contact with at least the other roller.

The alignment of the wheels of a motor car can be easily measured at various speeds and during braking.

The test instrument is advantageously equipped with a device adapted to automatically apply a controlled force, perpendicular to the surface of the road, on the vehicle. This can be applied during tests such as brake performance and serves to simulate of weight transfer during braking the vehicle while same moves on the road. It also serves to check the suspension of the vehicle and the steering system while this is under load. The means used for applying such force can be pneumatic, hydraulic, electric or mechanic. The force is applied to the suspension of the vehicle, to an axle, to a bumper, etc.

In order to evaluate various parameters of performance of the car, measurements are to be carried out on both wheels simultaneously or on each of these separately. In order to be able to do so, there is advantageously provided a coupling (11) which connects the two pairs of rollers (1) and (1) for some of the tests such as engine performance, engine losses, transmission performance, etc. and which is used in order to disconnect these during other tests such as wheel alignment, brake force, etc. The coupling can be an electromagnetic one, a pneumatic one, a hydraulic one, or mechanical.

The test device is connected with measuring and recording means, and with means for obtaining and recording certain derivatives of the registered data.

According to a preferred embodiment of the invention, the actual testing device is connected with a panel comprising two sets of instruments, one for the left hand side, the other for the right hand side of the vehicle, said instrument panel comprising:

Engine R.P.M., vehicle speed, brake distance and time, distance and time to the lock point of the wheels, brake efficiency and brake force, deceleration and acceleration time and distance, wheel output, wheel thrust, wheel lateral forces, and the like.

The device is provided with remote control means, so that the person performing the test, who sits in the driver's seat, can actuate the test device, its various recorders of digital data, and also means for converting these and derivatives thereof into permanent records of the data obtained. By the term "derivatives" there are meant data derived mathematically from actual measurements, and also continuous records of such data over a certain range of simulated speeds of travel. Some of the measurements which can be effected with the novel test device will become apparent from the following detailed description. Hitherto conventional car test means were adapted to measure various parameters at a given speed of travel only. According to the present invention means are provided for carrying out such measurements over a predetermined range of speeds of car travel. This is of great importance and value. Thus, for example, one of the possible measurements is that of brake performance during braking from a high speed of travel and up to standstill; car and wheel performance during this period of time, including the period after the wheels are locked; wheel alignment and performance during such braking, etc, measurement of motor power, transmission efficiency and losses, etc.

Amongst measurements which can be performed by the novel test device there may be mentioned.
1. Engine power (brake horse power) at different rates of revolution;
2. Record of brake power applied to each wheel when braking from a given speed to standstill;
3. Record of slip distance simulating the distance the vehicle will travel on a given road surface from the moment the wheels are locked and to standstill;
4. Measurement of lateral deviation of wheels upon braking at a given speed or in a range of speeds;
5. Measurement of wheel alignment of each wheel at given speeds or over a range of speeds;
6. Measurement of acceleration time and distance from standstill up to a predetermined speed;
7. Measurement of transmission and driving system performance and record thereof;
8. Calibration and test of various meters of the car; and
9. Measurement of motor and transmission performance for each of the gear shifts.

These measurements are effected as follows:

1. Engine Power

The motor-actuated wheels are positioned on the test device, The car is put in gear, and the car motor is actuated at full power by pressing the throttle to its maximum. The car is thus accelerated; it has to overcome the inertia of the flywheel, which are connected with each other during this measurement and the change of the rotational velocity of these is measured. The thus obtained values are converted automatically by the computer to data indicating thrust of the wheels and wheel horse power. The losses of the power train from the engine flywheel to the wheels is measured separately, as described in paragraph 7. Addition of power train losses to the wheel output indicates the engine output at the flywheel. The output can be computed instantly by the computer of the device; it can also be carried out by the operator.

2. Brake Force

The car is positioned with two wheels on the test device; it is accelerated to a predetermined speed (such as 100 km/hour) and the brake is applied. Measurements are effected for each of the two wheels of the pair, and the power applied to each of the wheels by the brake is computed from the time necessary for deceleration to a given speed or to standstill. The data measured are converted by the computer and recorded to a value indicative of the actual brake force. The flywheels are decelerated, and the deceleration of these is indicative of the power applied to each of the wheels. The measurement is repeated with the other wheels.

3. Slip-Distance Measurement

The car positioned on the test device is brought to a given speed of travel; the flywheels are thus brought to a corresponding velocity; the brakes are applied and at a certain point the wheels are locked. The central roller stops when the wheels are locked: and the time and distance are measured from this point until the flywheels stop. A value is obtained indicative of the distance the car will travel from the time the wheels are locked until the car comes to a standstill. All the measurements are done simultaneously. The weight of the car is taken into consideration and thus a representative value is obtained.

4. Wheel Alignment

The car is actuated while two of its wheels are on the test device and the car is brought from a certain speed to another. The car can be brought from zero to say 100 km/hour or vice versa. During this time the deviation of each of the two wheels tested is measured and recorded, thus giving a record of the deviation during actual travel for each velocity of travel. This measurement is effected without application of brakes and the indication of the exact deviation at different speeds is of considerable value.

5. Deviations during Braking

The car is brought to a certain speed, and braked. The deviation of the wheel alignment is measured and recorded during the entire period of braking and the deviation is recorded for the entire speed range. According to a preferred embodiment a downward force is applied to the car (for example on the bumper of the car) thus simulating actual car performance during travel.

6. Acceleration Measurement

The car is accelerated and the time is measured for attaining different speeds of travel. Values can be indicated by a digital counter or a continous record can be obtained.

7. Transmission and Motor Conditions

The car is positioned on the test device with the actuated wheels on the rollers. The car is brought to a speed of say 100 km/h; the car is put into gear and the engine is shut off while the accelerator pedal is pressed down to introduce air into the motor. The time is measured until the car decelerates from the initial speed to standstill, and this indicates also the distance the car will travel during this period of time. This measurement provides data indicative of motor condition and losses and of the losses of the mechanical system from the motor to the wheels. The values obtained can be expressed in horse power or brake power and also in distance versus time. A further measurement is made as set out above. The gear box is put in neutral, the clutch is depressed, separating the motor from the mechanical transmission, and thus only the mechanical system is measured. The roller system losses, however, are taken into consideration as a known factor. The difference provides data indicative of the state of the motor and losses in same.

8. Calibration of Vehicles Meters or Instruments

Speed distance meters of the car can be easily calibrated against accurate meters and measuring devices provided in the test device.

9. Motor and Transmission Performance

The car is actuated from standstill up to a given speed, while the actuated wheels are on the test device and the throttle is fully opened. The values of wheel speed and engine rotation against time are recorded while the car is driven at various speeds and in different gear shifts. These measured speeds and motor rotation against time and the graphical record provides data on the performance of the motor and of the mechanical (manual or automatic transmission) components. The graphical record provides also data on gear slip. Deviation from proper performance is noticed when graphs of speed and engine rotation against time are not parallel.

The combination of a test device with flywheels simulating car weight, which can be actuated to a given rotational velocity, and of measurement means for the various parameters of car performance and of means to record such data and certain mathematical derivatives thereof, providing a direct record of desired numerical data over a predetermined range of speeds or engine revolutions under conditions simulating car travel under conditions of acceleration or deceleration, providing data and records over such range of speeds is novel and of considerable value. The data and values obtained over a range of speeds provides a much more detailed information than that obtained hitherto by measurements at one speed or at a number of given speeds.

It is to be appreciated that the measuring and recording instruments indicated generally by the numeral 23 (FIG. 1) includes computing circuits indicated generally by the numeral 8 (FIG. 3) which may be a programmable computer. The computing circuits 8 can be readily constructed by persons familar with the parameters sought to be sensed, determined and displayed and/or recorded, the sensed parameters and the arithmatical formulae for deriving still other parameters being well known to those skilled in automative testing, the directions being set out under headings 1-9 above.

What is claimed is:

1. A testing system for testing vehicular performance under conditions simulating travel in a predetermined range of speeds or engine revolutions, comprising:
   two sets of support rollers, each set of support rollers including two rollers mounted to rotate on parallel axes and supporting one of the wheels of the vehicle at two angularly spaced points around the wheel;
   first coupling means for coupling the rotation of said two rollers of each set of support rollers;
   second coupling means for selectively coupling and uncoupling the rotation of one set of support rollers to the other set of support rollers;
   two flywheels, each of a mass simulating the weight of the vehicle tested, and each of said flywheels connected to one of said rollers in a corresponding set of support rollers;
   two driving means, each for driving a corresponding one of said flywheels;
   two idling rollers, each disposed between the two rollers of a corresponding set of support rollers, for engaging the periphery of a wheel of the vehicle;
   two lateral deflection means, each for sensing the lateral force of deflection of a correspondingly one of said idling rollers and for producing a signal corresponding thereto;
   two flywheel motion sensing means, each for sensing the rotational motion of a corresponding one of said flywheels and producing a signal corresponding thereto;
   two idling roller velocity sensing means, each for sensing the rotational velocity of a corresponding one of said idling rollers and for producing a signal corresponding thereto;
   force means, for applying a downwardly directed force on the vehicle to simulate weight transfer during braking;
   engine power means, connected to said two flywheel motion sensing means for displaying or recording the engine power of the vehicle;
   wheel thrust means, connected to said two flywheel motion sensing means, for displaying or recording the wheel thrust of the vehicle;
   brake force means, connected to said two flywheel motion sensing means, for displaying or recording the force applied to each of the wheels by the brake at a predetermined velocity;
   deceleration means, connected to said two flywheel motion sensing means, for displaying or recording the deceleration of the vehicle after the brakes are applied at a given speed;
   slip distance means, connected to said two lateral deflection means and to said two flywheel motion sensing means, for displaying or recording the distance the vehicle will travel from the moment the wheels are locked until the vehicle stops;
   wheel alignment means, connected to said two lateral deflection means, for displaying or recording the wheel alignment of the vehicle when the vehicle is brought from one predetermined speed to another predetermined speed, and when said vehicle is braked from a predetermined speed to a standstill;
   braking distance means, connected to said two flywheel motion sensing means, for displaying or recording the distance the vehicle would travel when braked from a particular speed;
   distance and time means, connected to said two flywheel motion sensing means, for displaying or recording the distance and time the vehicle reaches a given speed from a standstill;
   power train losses means, connected to said two flywheel motion sensing means, for displaying or recording the power train losses from the flywheel to the wheels; and
   motor performance and transmission slip means, connected to said two flywheel motion sensing means, for displaying or recording slippage of the automatic transmission of the vehicle and the performance of the motor.

2. A testing system, according to claim 1, further including:
   remote control means, for allowing the testing system to be operated by a person located in the driver's seat of the vehicle.

3. A testing system, according to claim 1, wherein said two idling rollers are free to move laterally.

4. A testing system, according to claim 1, wherein said two lateral deflection means comprise two strain gauges.

5. A method of determining the engine power of a vehicle using the apparatus of claim 1, comprising the steps of:
   placing front or rear drive wheels of the vehicle on said support rollers;
   placing the vehicle in gear;
   accelerating the engine of the vehicle by pressing the throttle to its maximum position, thereby accelerating said support rollers and said flywheels;
   measuring the rotational motion of said flywheels with said two flywheel motion sensing means; and
   displaying or recording the engine power with said engine power means.

6. A method of determining wheel thrust of a vehicle using the apparatus of claim 1, comprising the steps of:
   placing front or rear drive wheels of the vehicle on said support rollers;
   placing the vehicle in gear;
   accelerating the engine of the vehicle by pressing the throttle to its maximum position, thereby accelerating said support rollers and said flywheels;
   measuring the rotational motion of said flywheels with said two flywheel motion sensing means; and
   displaying or recording the wheel thrust with said wheel thrust means.

7. A method of determining the brake force using the apparatus of claim 1, comprising the steps of:
   placing the front or rear wheels of the vehicle on said support rollers;
   accelerating the wheels of the vehicle to a predetermined speed, thereby accelerating said support rollers and said flywheels;
   applying the brakes;
   measuring the rotational motion of said flywheels with said flywheel motion sensing means; and
   displaying or recording the braking force with said brake force means.

8. A method of determining the deceleration of a vehicle using the apparatus of claim 1, comprising the steps of:
   placing the front or rear wheels of the vehicle on said support rollers;
   accelerating the wheels of the vehicle to a given speed, thereby accelerating said support rollers and said flywheels;

applying the brakes of the vehicle;

measuring the rotational motion of said flywheels with said two flywheel motion sensing means; and displaying or recording the deceleration of the vehicle with said deceleration means.

9. A method of determining the slip distance of the vehicle using the apparatus of claim 1, comprising the steps of:

placing the front or rear wheels of the vehicle on said support rollers;

accelerating the wheels of the vehicle to a given speed, and thereby accelerating said support rollers and said flywheels;

applying the brakes of the vehicle so that the brakes lock;

determining the time at which said idling rollers stop rotating, with said two idling rollers velocity sensing means;

displaying or recording the distance the vehicle will travel from the moment the wheels are locked until the vehicle stops with said slip distance means.

10. A method of determining the wheel alignment of a vehicle using the apparatus of claim 1 comprising the steps of:

placing the front or rear wheels of the vehicle in said support rollers;

accelerating the wheels of the vehicle from an initial speed to a final speed, thereby accelerating said support rollers and said flywheels, simultaneously measuring the rotational motion of said flywheels with said two flywheel motion sensing means, and simultaneously measuring the lateral force of deflection of said idling rollers with said two lateral deflection means; and displaying or recording the alignment of the wheels of the vehicle from the initial speed to the final speed with said wheel alignment means.

11. A method of determining the wheel alignment of a vehicle during braking, using the apparatus of claim 1, comprising the steps of:

placing the front or rear wheels of the vehicle on said support rollers;

accelerating the wheels of the vehicle to a given speed, thereby accelerating said support rollers and said flywheels;

applying the brakes until the wheels of the vehicle stop rotating, and simultaneously applying a force vertically downward on the vehicle, and simultaneously measuring the rotational motion of said flywheels with said two flywheel motion sensing means, and simultaneously measuring the lateral force of deflection of said idling rollers with said two lateral deflection means; and displaying or recording the alignment of the wheels of the vehicle from the given speed to the final speed with said wheel alignment means.

12. A method of determining the braking distance of a vehicle, using the apparatus of claim 1, comprising the steps of:

placing the front or rear wheels of the vehicle on said support rollers;

accelerating the wheels of the vehicle to a given speed, thereby accelerating said support rollers and said flywheels;

applying the brakes of the vehicle until the wheels of the vehicle stop rotating, and simultaneously measuring the rotational motion of said flywheels with said two flywheel motion sensing means; and displaying or recording the distance the vehicle would travel when braked from said given speed with said braking distance means.

13. A method of determining the slippage in the transmission of a vehicle and the condition of the motor using the apparatus of claim 1, comprising the steps of:

placing front or rear drive wheels of the vehicle on said support rollers;

accelerating the wheels of the vehicle up to a given speed;

changing the speed of the vehicle and changing the gears that drive the wheels of the vehicle, and simultaneously measuring the rotation of the motor of the vehicle and simultaneously measuring the rotational motion of said flywheels with said two flywheel motion sensing means; and displaying or recording the degree of slippage of the transmission of the vehicle and the condition of the motor with said motor performance and transmission slip means.

14. A method of determining power train losses in a vehicle using the apparatus of claim 1, comprising the steps of:

placing the front or rear wheels of the vehicle on said support rollers;

turning on the engine of the vehicle;

accelerating the wheels of said vehicle;

placing the vehicle in a given gear;

shutting off the engine;

pressing down the accelerator pedal of the vehicle to introduce air into the motor;

measuring the rotational motion of said flywheels with said two flywheel motion sensing means; and displaying or recording the power train losses from the flywheel to the wheels, of the vehicle, with said power train losses means.

15. A method of determining the distance and time the vehicle reaches a given speed from a standstill using the apparatus of claim 1, comprising the steps of:

placing the front or rear wheels of the vehicle on said support rollers;

accelerating the wheels of the vehicle, thereby accelerating the support rollers and the flywheels;

measuring the rotational motion of said flywheels with said flywheel motion sensing means; and displaying or recording the distance and time the vehicle takes to reach a given speed from a standstill, with said distance and time means.

* * * * *